(12) United States Patent
Yoon et al.

(10) Patent No.: US 12,513,782 B2
(45) Date of Patent: Dec. 30, 2025

(54) ELECTRIC KETTLE HAVING WARMING FUNCTION AND METHOD FOR OPERATING SAME

(71) Applicant: LG ELECTRONICS INC., Seoul (KR)

(72) Inventors: Sehwa Yoon, Seoul (KR); Jea Shik Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 924 days.

(21) Appl. No.: 17/770,913

(22) PCT Filed: Sep. 24, 2020

(86) PCT No.: PCT/KR2020/013011
§ 371 (c)(1),
(2) Date: Apr. 21, 2022

(87) PCT Pub. No.: WO2021/080202
PCT Pub. Date: Apr. 29, 2021

(65) Prior Publication Data
US 2022/0369422 A1    Nov. 17, 2022

(30) Foreign Application Priority Data

Oct. 23, 2019  (KR) .................. 10-2019-0132242

(51) Int. Cl.
*H05B 1/02*         (2006.01)
*A47J 27/21*        (2006.01)
(52) U.S. Cl.
CPC ........ *H05B 1/0269* (2013.01); *A47J 27/2105* (2013.01); *A47J 27/21058* (2013.01)

(58) Field of Classification Search
CPC ..... A47J 27/21041; A47J 31/54; A47J 41/005
USPC ........................................... 219/432
See application file for complete search history.

(56) References Cited

U.S. PATENT DOCUMENTS

| 2004/0144257 | A1  | 7/2004 | Battu |
| 2009/0151891 | A1* | 6/2009 | Li ................. A47J 27/21041 62/3.2 |
| 2019/0223640 | A1  | 7/2019 | Chen et al. |
| 2021/0204746 | A1* | 7/2021 | Katsunuma ......... H05B 1/0269 |

FOREIGN PATENT DOCUMENTS

WO    2019051529 A1   3/2019

* cited by examiner

*Primary Examiner* — Vy T Nguyen
(74) *Attorney, Agent, or Firm* — Bryan Cave Leighton Paisner LLP

(57) ABSTRACT

An electric kettle includes a container in which water is received, and a base on which the container is seated, wherein the container includes a handle, a body defining space in which water is received, a lid configured to open and close an open upper surface of the body, a heating module mounted on the lower surface of the body and configured to heat water contained in the body, a capacitor; a memory; and a controller configured to detect a voltage of the capacitor according to a preset period and to perform a keep-warm operation based on voltage difference between a currently detected first voltage of the capacitor and a previously detected second voltage of the capacitor, and when the body is seated on the base, commercial power is supplied to the base, and the capacitor is charged by the power transmitted through the base.

16 Claims, 11 Drawing Sheets

ELECTRIC KETTLE HAVING WARMING FUNCTION AND METHOD FOR OPERATING SAME

CROSS-REFERENCE TO RELATED APPLICATIONS

This application is the National Stage filing under 35 U.S.C. 371 of International Application No. PCT/KR2020/013011, filed on Sep. 24, 2020, which claims the benefit of Korean patent application No. 10-2019-0132242, filed on Oct. 23, 2019, the contents of which are all hereby incorporated by reference herein in their entirety.

TECHNICAL FIELD

The present disclosure relates generally to an electric kettle having a keep-warm function and a method for operating the same.

BACKGROUND ART

Generally, an electric kettle is a device which heats water received in a body thereof by supplying electricity thereto by a heating element such as a heater. Furthermore, the electric kettle is configured such that the body is removable from a base to which power is supplied. With the body seated on the base, water is heated, and a user lifts the body by holding a handle such that the body is removed from the base. This type of electric kettle is normally called as various names such as a wireless electric kettle, a wireless electric pot, and a coffee pot, etc.

The electric kettle has a keep-warm function in which power is continuously supplied to the heating element at a low level such that the temperature of water received in the body is maintained at a desired temperature. A user can preset the keep-warm function when the user wants to keep water temperature at the desired temperature. When using the keep-warm function, a user presets a keep-warm temperature, and a period of keep-warm maintaining time, etc.

In U.S. Pat. No. 8,405,004, "INTELLIGENT ELECTRIC KETTLE HAVING KEEP-WARM FUNCTION" is disclosed. In the prior art, a heating element which heats water received in a body is included, and a technique for precisely controlling the temperature of water during heating or a keep-warm cycle is disclosed.

Meanwhile, a user uses the keep-warm function of the electric kettle for beverage preparation. For example, a user may prepare several cups of tea. A user may prepare a cup of tea by removing the body of the electric kettle from a base and filling a cup with water, and then may reseat the body of the electric kettle on the base. After a predetermined period of time, a user may prepare another cup of tea.

In the electric kettle, when the body of the electric kettle is removed from the base, settings of the keep-warm function are reset or initialized. In a case in which a user reseats the body of the electric kettle on the base after removing the body from the base, the keep-warm function of the electric kettle does not operate.

Accordingly, in the prior electric kettle, a user is required to perform the keep-warm setting of the electric kettle whenever seating the body of the electric kettle on the base.

In addition, when the body of the electric kettle is removed from the base, power is not supplied to the heater of the electric kettle, so water contained in the body of the electric kettle cools. Accordingly, in order to maintain water contained in the body of the electric kettle at a predetermined temperature, a user is required to seat the body of the electric kettle on the base.

DISCLOSURE

Technical Problem

The present disclosure is intended to propose an electric kettle and a method for operating the same in which the usability of the electric kettle is improved during the use of a keep-warm function thereof.

In addition, the present disclosure is intended to propose an electric kettle and a method for operating the same in which even if a body of the electric kettle is removed from a base thereof, a keep-warm operation of the electric kettle can be performed.

Furthermore, the present disclosure is intended to propose an electric kettle and a method for operating the same in which even if the body of the electric kettle is reseated on the base after the body is removed from the base, a keep-warm setting related to the keep-warm function is not required to be re-performed.

Additionally, the present disclosure is intended to propose an electric kettle and a method for operating the same in which when power is not supplied to a controller of the electric kettle after the body of the electric kettle is removed from the base, a capacitor can be used to calculate a period of time for which the body of the electric kettle is removed from the base.

The objectives of the present disclosure are not limited to the objectives mentioned above, and other objectives that are not mentioned will be clearly understood by those skilled in the art to which the present disclosure belongs from description below.

Technical Solution

An electric kettle according to a first embodiment of the present disclosure includes: a container in which water is received, and a base on which the container is seated, wherein the container may include: a handle; a body defining space in which water is received; a lid configured to open and close an open upper surface of the body; a heating module mounted on a lower surface of the body and configured to heat water contained in the body; a capacitor; a memory; and a controller configured to detect a voltage of the capacitor when the body is seated on the base and to perform a keep-warm operation based on the detected voltage, and when the body is seated on the base, commercial power is supplied to the base, and the capacitor may be charged by the power transmitted through the base. Accordingly, in a case in which the body of the electric kettle is reseated on the base after the body is removed from the base, a period of time for which the body is removed from the base may be known through the capacitor, so the keep-warm operation may be continuously performed. Even if a user removes the body of the electric kettle from the base of the electric kettle, a keep-warm function of the electric kettle may be used for a predetermined period of time.

When the detected voltage is greater than or equal to a reference voltage, the controller may perform the keep-warm operation. When the detected voltage is greater than or equal to the reference voltage, the controller may determine whether the keep-warm operation is preset by using keep-warm-related information stored in the memory, and may perform the keep-warm operation when the keep-warm operation is preset. According to the embodiment, even if the body of the electric kettle is removed from the base, a user may not be required to input a keep-warm setting again.

The base may include a lower power module to which the commercial power is applied, and the body may include an upper power module in contact with the lower power module when the body is seated on the base, and the capacitor may be charged by a voltage transmitted from the upper power module through the lower power module.

When the keep-warm operation is preset by a user, the controller stores keep-warm-related information in the memory. According to the embodiment, by using the keep-warm-related information stored in the memory, the controller may perform the keep-warm operation without a user resetting the keep-warm operation even when the body is reseated on the base after the body is removed from the base.

The reference voltage may be a predetermined voltage of the capacitor measured or detected after the capacitor is discharged for a predetermined period of time in a state in which the capacitor is fully charged.

The electric kettle may further include: a handle cover formed of a metal material and constituting the exterior of the protruding upper surface of the handle; and a touch sensor mounted to the handle and being in close contact with the rear surface of the handle cover so as to detect touching on the handle cover. According to the embodiment, a user may select the operation mode of the electric kettle.

The handle may include a manipulation part formed on an upper surface thereof such that the manipulation part is able to be manipulated by a user at a position corresponding to the touch sensor, and the manipulation part may include: a temperature manipulation part for presetting a heating temperature of the space; a keep-warm manipulation part for performing the keep-warm operation; and a time manipulation part for presetting a period of keep-warm maintaining time. According to the embodiment, a user may preset the keep-warm operation of the electric kettle.

The capacitor may have a capacity of several tens of uF. According to the embodiment, by using a small-capacity capacitor, the electric kettle having a simple configuration may perform the keep-warm operation for a predetermined period of time even when the body of the electric kettle is reseated on the base after the body is removed from the base.

The electric kettle according to a second embodiment of the present disclosure includes: the container in which water is received, and the base on which the container is seated, wherein the container may include: the handle; the body defining space in which water is received; a lid configured to open and close an open upper surface of the body; the heating module mounted on the lower surface of the body and configured to heat water contained in the body; the capacitor; the memory; and the controller configured to detect a voltage of the capacitor according to a preset period and to perform the keep-warm operation based on a voltage difference between a currently detected first voltage of the capacitor and a previously detected second voltage of the capacitor, and when the body is seated on the base, commercial power may be supplied to the base, and the capacitor may be charged by the power transmitted through the base.

When the first voltage is less than the second voltage, and the voltage difference therebetween is less than or equal to a reference value obtained through the keep-warm-related information stored in the memory, the controller may perform the keep-warm operation according to the keep-warm-related information. When the voltage difference is less than or equal to the reference value, the controller may determine whether the keep-warm operation is preset and may perform the keep-warm operation according to the keep-warm-related information when the keep-warm operation is preset. According to the embodiment, even if there is a period of time for which power is not supplied to the controller of the electric kettle, the controller, when receiving power later, may calculate a period of time for which the body of the electric kettle is removed from the base by using the capacitor.

In addition, a method for operating the electric kettle according to the first embodiment of the present disclosure which includes the container in which water is received and the base on which the container is seated includes: storing the keep-warm-related information of the electric kettle in the memory; detecting the voltage of the capacitor configured to be charged by commercial power when the body of the container is reseated on the base after the body is removed from the base; and performing the keep-warm operation according to the keep-warm-related information based on the detected voltage. According to the embodiment, even if the body of the electric kettle is reseated on the base after the body is removed from the base, the keep-warm operation set previously by a user may be performed again.

The performing of the keep-warm operation may include performing the keep-warm operation according to the keep-warm-related information when the detected voltage is greater than or equal to a reference voltage, or may include: determining whether the keep-warm operation is preset when the detected voltage is greater than or equal to the reference voltage, and performing the keep-warm operation when the keep-warm operation is preset. According to the embodiment, even if the electric kettle is turned on after the electric kettle is turned off, a period of time taken until the electric kettle is reseated on the body from time at which the electric kettle is removed from the body may be calculated.

The method for operating the electric kettle may further include storing the keep-warm-related information in the memory when the keep-warm operation is preset by a user. The reference voltage may be a predetermined voltage of the capacitor measured or detected after the capacitor is discharged for a predetermined period of time in a state in which the capacitor is fully charged. According to the embodiment, when the body of the electric kettle is reseated on the base within a predetermined period of time after the body is removed from the base, a user may not be required to set the keep-warm operation again.

In addition, a method for operating the electric kettle according to the second embodiment of the present disclosure which includes the container in which water is received and the base on which the container is seated may include: storing the keep-warm-related information of the electric kettle in the memory; detecting a voltage of the capacitor configured to be charged by commercial power applied through the base according to a preset period; calculating voltage difference between the currently detected first voltage the capacitor and the previously detected second voltage the capacitor; and performing the keep-warm operation of the electric kettle according to the keep-warm-related information based on the voltage difference. According to the embodiment, even if the body of the electric kettle is reseated on the base after the body is removed from the base, the capacitor may be used to re-perform the keep-warm operation set previously by a user.

Advantageous Effects

The electric kettle of the present disclosure has the following effects.

According to the electric kettle of the present disclosure, a period of time taken until the body is reseated on the base from time at which the body is removed from the base may be calculated by using a super capacitor or a small-capacity capacitor, thereby eliminating need for a user to re-perform the keep-warm setting related to the keep-warm function.

In addition, according to the electric kettle of the present disclosure, during the use of the keep-warm function, the usability of the electric kettle may be improved.

MODE FOR INVENTION

Hereinbelow, the detailed embodiments of the present disclosure will be described in detail with reference to the accompanying drawings. However, the present disclosure cannot be said to be limited to the embodiments in which the spirit of the present disclosure is presented, and other inventions that are degenerated by the addition, change, and deletion of other components or other embodiments included within the scope of the present disclosure may be easily proposed.

Figure 1:
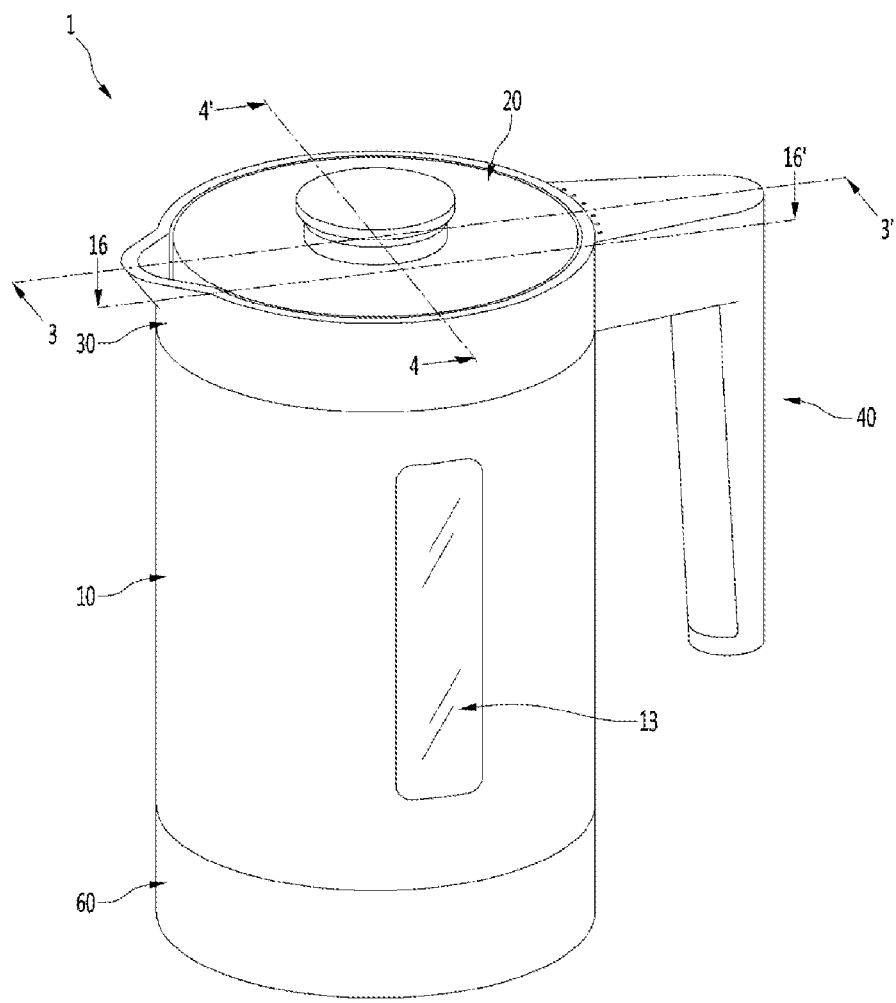
FIG. 1 is a perspective view of an electric kettle of the present disclosure according to an embodiment.
Figure 2:
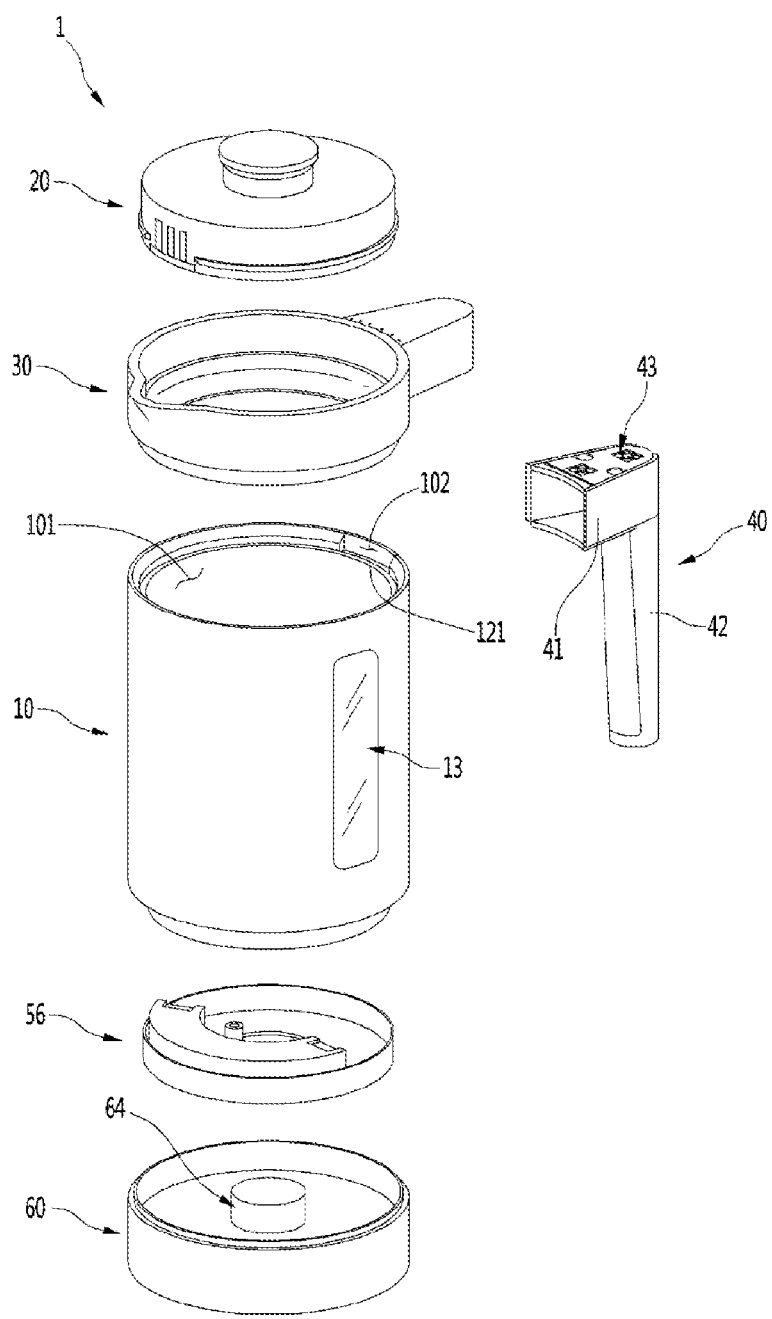
FIG. 2 is an exploded perspective view of the electric kettle.
Figure 3:
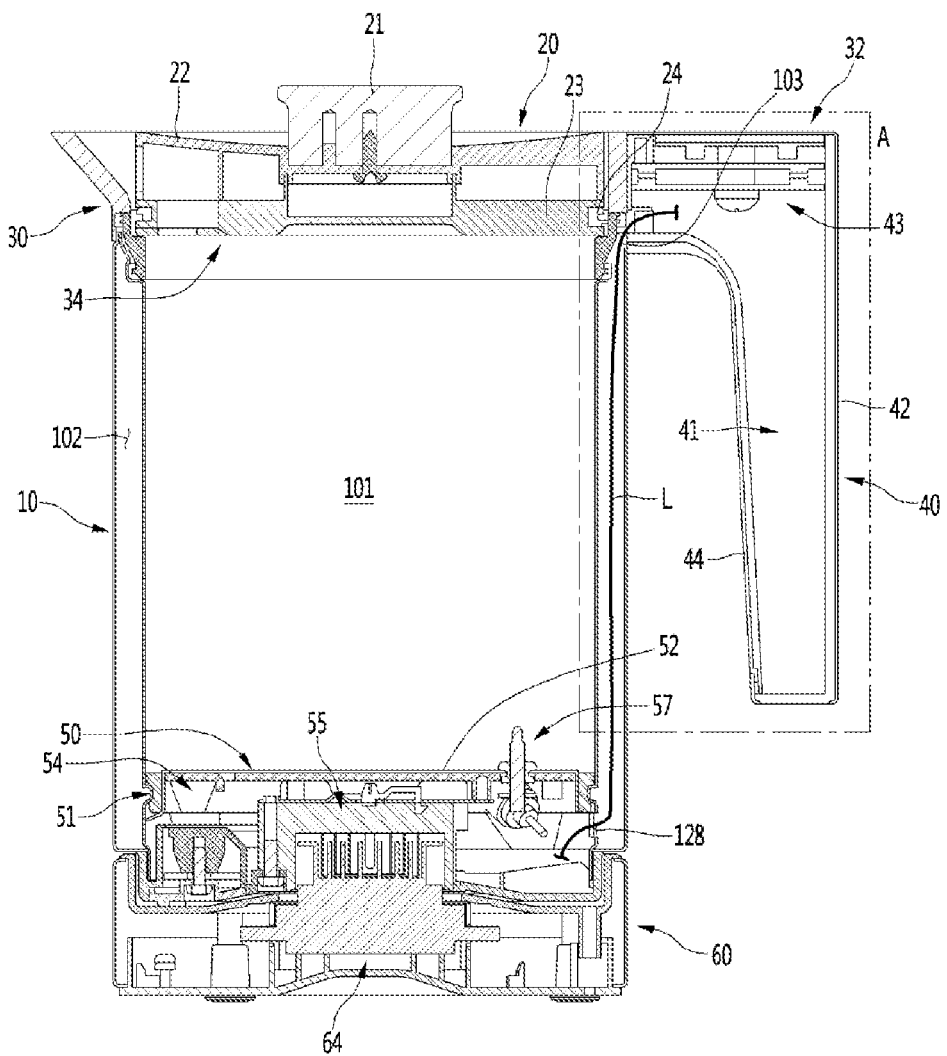
FIG. 3 is a sectional view taken along line 3-3' of FIG. 1.
Figure 4:
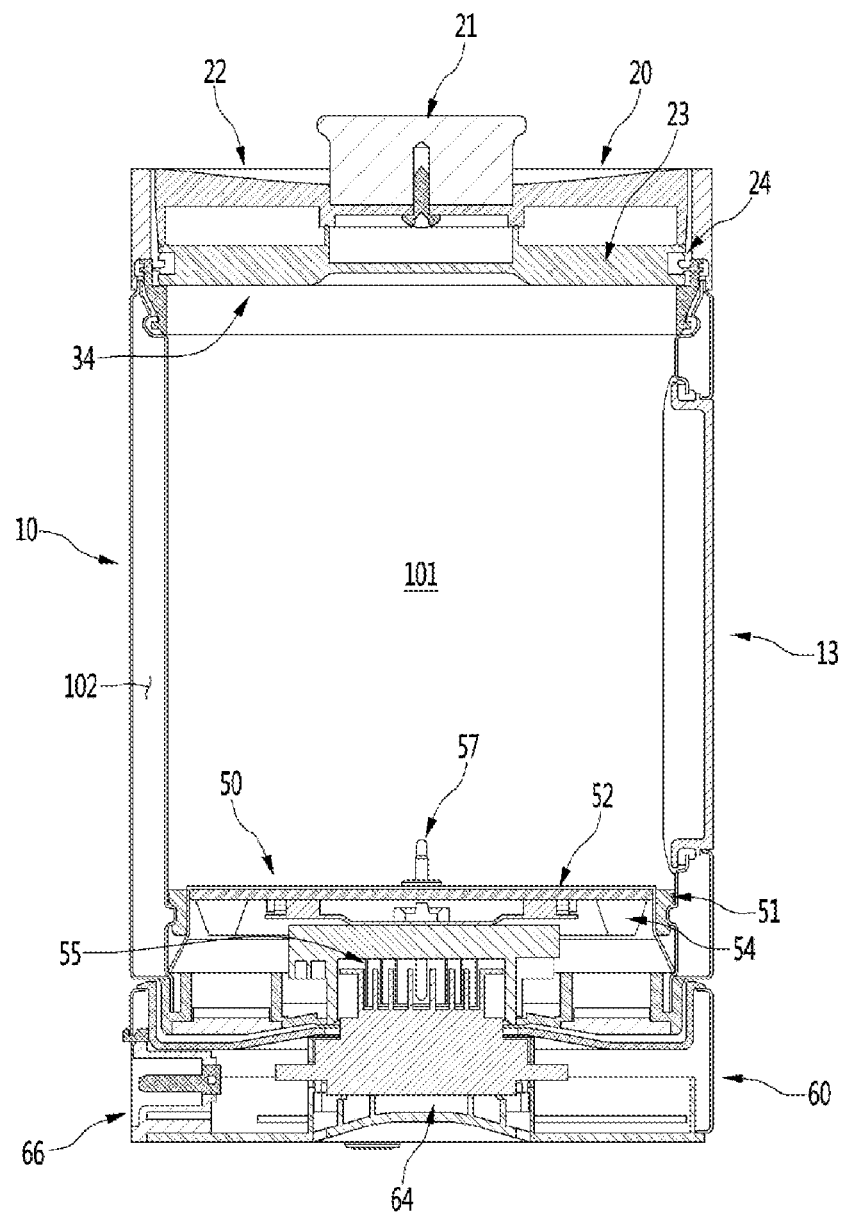
FIG. 4 is a sectional view taken along line 4-4' of FIG. 1.

FIG. 1 is a perspective view of the electric kettle of the present disclosure according to an embodiment. Additionally, FIG. 2 is an exploded perspective view of the electric kettle. Furthermore, FIG. 3 is a sectional view taken along line 3-3' of FIG. 1. In addition, FIG. 4 is a sectional view taken along line 4-4' of FIG. 1.

As illustrated in FIGS. 1 to 4, the electric kettle 1 according to the embodiment of the present disclosure may be composed of a container in which water is received, and a base 60 on which the container is seated.

The container may be configured to have a cylindrical shape as a whole and may include a body 10, an upper body 30, a heating module 50, a lid 20, and a handle 40. Remaining components of the container except the handle 40 may be formed in cylindrical shapes to have vertically arranged structures, and the handle 40 may be formed on a side of the upper body 30 by protruding therefrom.

The base 60 may be disposed on the surface of the ground, and may be connected to a power plug to receive external power. Furthermore, the body 10 which is assembled may be seated on the upper surface of the base 60. The body 10 may be configured to have the shape of a cylinder having a heating space 101 in which water is received and heated. Furthermore, while the body 10 is seated on the base 60, power may be supplied to the body 10.

According to an embodiment, the base 60 and the body 10 may receive power by being in contact with a power terminal. While the body 10 is seated on the base 60, an upper power module 55 of the body 10 and a lower power module 64 of the base 60 may be in contact with each other and may be supplied with power. In this state, due to the power supply, a heater 54 may be heated to boil water.

When the body 10 is seated on the base 60, the upper power module 55 of the body 10 may be connected to a power module 64 of the base 60, and commercial power may be supplied to the upper power module 55 of the body 10 by the power module 64 of the base.

According to another embodiment, power supply between the base 60 and the body 10 may be performed by electromagnetic induction. To this end, the base 60 may be provided with the lower power module 64 serving as a primary coil, and the body 10 corresponding thereto may be provided with the upper power module 55 serving as a secondary coil.

The body 10 may be configured to have a cylindrical shape having open upper and lower surfaces. The open lower surface of the body 10 may be covered by the heating module 50, and the upper surface of the body 10 may be covered by the lid 20. The heating module 50 may constitute a portion of the lower part of the body 10, and may be referred to as a lower body 50.

The heating module 50 may include a heating plate 52 constituting the bottom surface of the inside of the body 10, and the heater 54 configured to heat the heating plate 52, wherein the heating plate 52 may be heated by power supplied from the upper power module 55. Furthermore, the heating module 50 may include a bottom cover 56 constituting the lower surface of the body 10.

As illustrated in FIG. 3, the heating module 50 may be disposed inside the open lower surface of the body 10. When the bottom cover 56 is removed from the body, remaining components of the heating module 50 may be exposed to the outside through the open lower surface of the body 10.

Particularly, the upper power module 55 may be disposed at the center portion of the open lower surface of the body 10, and the heater 54 may be provided outside the upper power module 55 so as to heat the heating plate 52. Furthermore, the bottom cover 56 may be provided with a cover PCB (not shown) for supplying power to the heater 54.

Specifically, the upper power module 55 may be located at the center of the heating module 50. The heater 54 may be configured as a sheathe heater. Additionally, the heater 54 may be located at a side outer than the upper power module 55, and may be disposed along the circumference of the heating plate 52. The opposite ends of the heater 54 may be spaced apart from each other at positions adjacent to each other, and a connection terminal 763c may be exposed to the spaced opposite ends of the heater and may be connected thereto by the cover PCB 130 and an electric wire.

The upper body 30 may be mounted to the upper end of the body 10. The upper body 30 and the body 10 may be made of the same metal materials, or may be made of different materials but may be formed to have the same textures. The upper body 30 may be configured to have a cylindrical or ring shape having a low height. Furthermore, a spout 311 may be formed on an end of the upper body 30 by protruding therefrom such that water contained in the body 10 is poured through the spout.

The handle 40 may be mounted at a side opposite to the spout 311. The handle 40 may be mounted to a handle cover 32 extending outward from a side of the upper body 30, and may be fixedly mounted on the outer side surface of the upper body 30.

In addition, the handle 40 may be inserted into the handle cover 32, and may include a handle frame 41 extending downward such that a user can hold the handle frame, a handle decoration 42 covering an outer side surface of the handle frame 41, and a grip part 44 constituting a portion of the outer side surface, which is directed to the body 10, of the handle frame 41. The handle decoration 42 may be formed of the same metal as or of a material having the same appearance as the body 10 and the handle cover 32. Furthermore, at least a portion of the grip part 44 may be formed of rubber or a silicone material such that a user does not slip when holding the handle 40.

Meanwhile, the open upper surface of the electric kettle 1, that is, the upper surface of the upper body 30 may be covered by the lid 20. When closed, the lid 20 may constitute the upper surface of the electric kettle 1, and may be in contact with the circumference of the upper body 30 and may seal the inside of the electric kettle 1.

Furthermore, when the electric kettle 1 is tilted in a state in which the lid 20 is closed, the electric kettle may be configured such that water is poured out of the spout through the lid 20.

The handle 40 may include the handle frame 41 mounted fixedly to the inside of the handle cover 32, the grip part 44 coupled to the handle frame 41, and a handle PCB 43 and the handle decoration 42 provided inside the handle frame 41. Furthermore, the handle cover 32 may be configured to receive the upper part of the handle frame 41, and may be considered as a component of the handle 40.

Meanwhile, the handle cover 32 is intended to allow the handle 40 to be mounted thereto, and may be formed of a plate-shaped metal material, and may be configured to receive the upper end of the handle 40. In the handle cover 32, a manipulation part may be formed on a handle cover upper surface 325, and a handle cover side surface 326 may extend downward from the handle cover upper surface 325 along a periphery thereof. In this case, the handle cover upper surface 325 may be located at the same height as the upper end of a body top 31, and the lower end of the handle cover side surface 326 may correspond to the lower end of the body top 31. Furthermore, the open front end of the handle cover 32 may be configured to have a shape corresponding to the outer side surface of the body top 31, and may be coupled thereto by welding.

The grip part 44 may cover the open lower and rear surfaces of the handle frame 41 so as to constitute the rear half of the handle 40. The grip part 44 may be made of a plastic material and may be coupled to the handle frame 41 so as to have a shape configured such that a user can hold the grip part by the hand.

Meanwhile, one side of the grip part 44 may be corrugated or wrinkled such hat a user is prevented from slipping when holding the grip part, so the grip part 44 may be stably held to raise the electric kettle 1. Furthermore, a grip part sheet 42b (FIG. 5) may be attached to at least a portion of the grip part 44. The grip part sheet 42b may be of a material having high friction such as rubber or silicone, and may allow a user to be further prevented from slipping when holding the handle 40.

Figure 5:
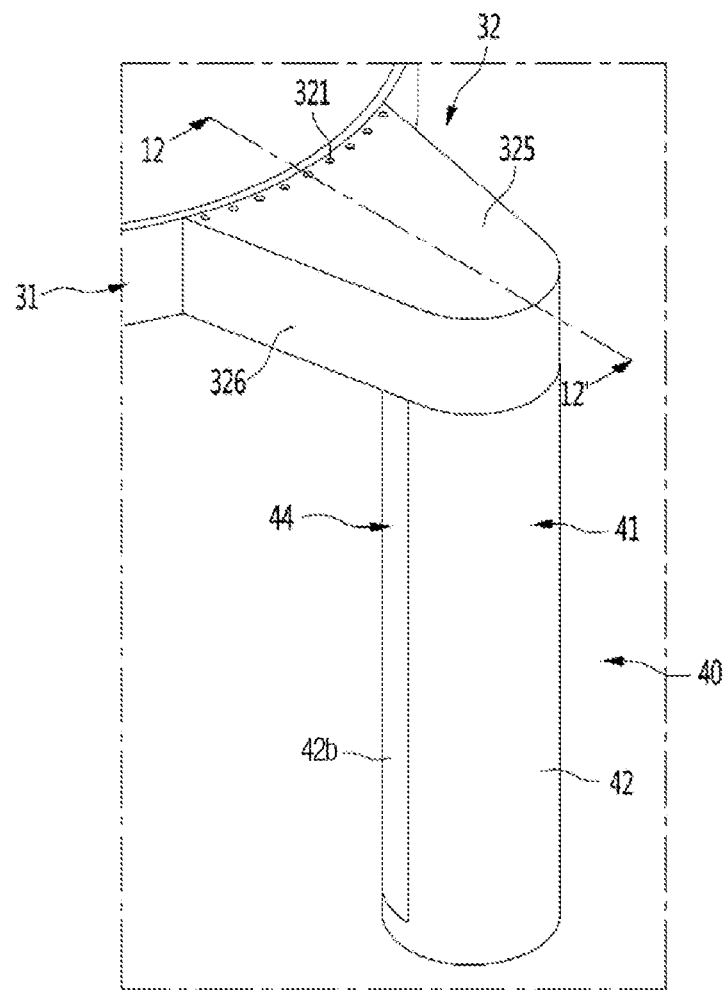
FIG. 5 is an enlarged view of a handle mounted to the electric kettle.
Figure 6:
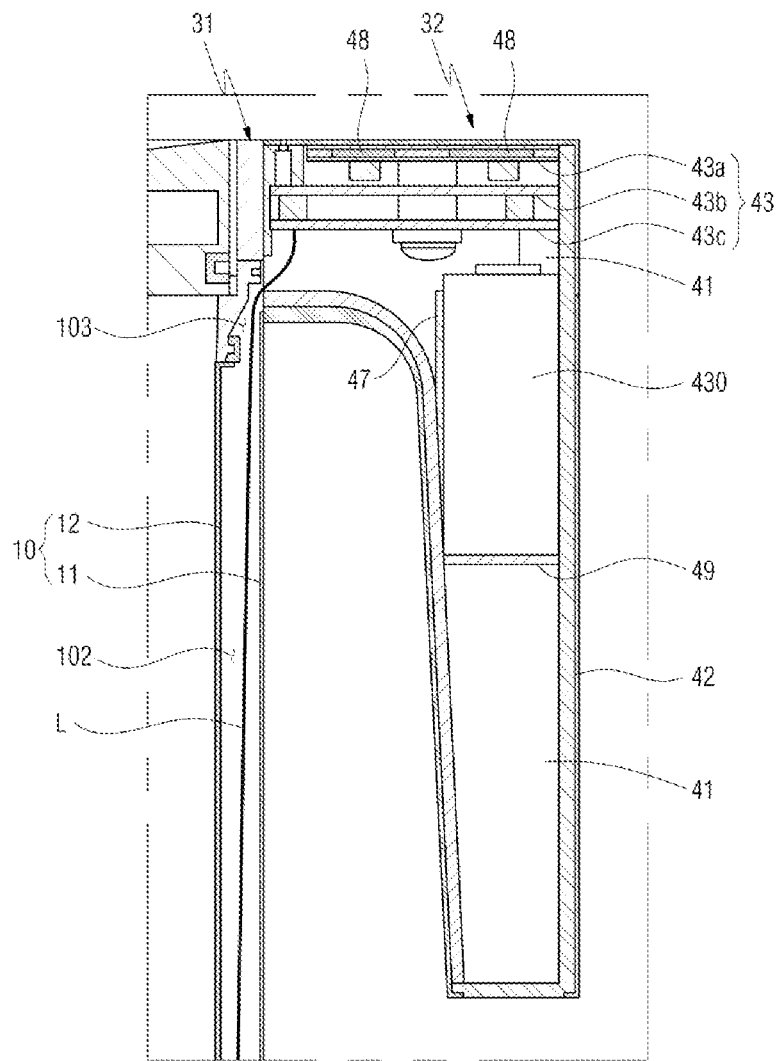
FIG. 6 is an enlarged view of an A part of FIG. 3.

FIG. 5 is an enlarged view of the handle mounted to the electric kettle. Furthermore, FIG. 6 is an enlarged view of an A part of FIG. 3. Furthermore, FIG. 7 is a partially enlarged view illustrating the handle cover.

Figure 7:
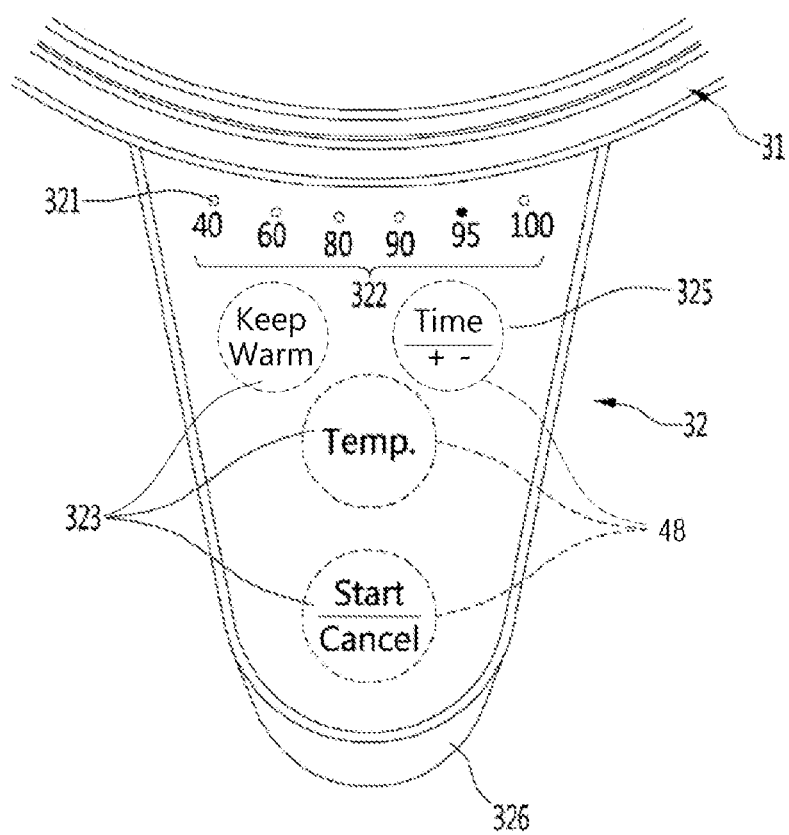
FIG. 7 is a partially enlarged view illustrating a handle cover.

As illustrated in FIGS. 5 to 7, the handle 40 may be mounted to the handle cover 32, and may protrude to one side of the body 10. The upper part of the handle 40 may be mounted to the handle cover 32 and the remaining portion of the handle may be configured by extending downward at a position spaced apart from the outer side surface of the body 10 such that a user can hold the handle with the hand.

In the handle 40, only the upper end of the handle 40 may be fixed to the upper end of the body 10 or one side of the upper body 30, and a remaining portion of the handle 40 except the upper end of the handle 40 may be spaced apart from the body 10.

In addition, the handle cover 32 may be formed of the same metal material as the upper body 30 and the body 10, and may be configured to provide a sense unified with the upper body 30 in a state in which the handle cover is coupled to the upper body 30. Furthermore, the handle 40 may be provided with the handle decoration 42 formed of the same material as the body 10, the upper body 30, and the handle cover 32 and constituting the exterior of the handle 40, so the handle 40 may have the exterior further unified therewith.

The handle cover 32 may be provided with the manipulation part 323. By manipulating the manipulation part, a user may manipulate an on/off manipulation or a temperature control. To this end, the handle cover 32, that is, the handle 40 may be provided with the handle PCB 43, and an electric wire L connecting the handle PCB 43 with the heating module 50 may be configured to pass through the body 10. Meanwhile, the handle cover 32 may be further provided with a display part 322 for displaying the operation state of the electric kettle 1.

The handle PCB 43 may include a touch PCB 43a to which a touch sensor 48 is mounted, a display PCB 43b provided under the touch PCB 43a and having an LED mounted thereto, the LED being configured to emit light to the display part 322, and an operation PCB 43c provided under the display PCB 43b and configured to control the operation of the heater 54. The handle PCB 43 may control the overall operation of the electric kettle 1, and thus may be called a main PCB 43.

The touch PCB 43a may be in close contact with the upper surface of the handle cover 32, and the touch sensor may be provided at a position corresponding to the manipulation part 323. The touch PCB 43a may be disposed to be in contact with the upper surface of the handle cover 32. The touch sensor 48 may be configured as a piezo-type touch sensor using a piezoelectric element so as to prevent misdetection and to effectively detect touch on the handle cover 32 made of a stainless material. That is, during the manipulation of the manipulation part 323, the touch sensor may detect the transformation of the upper surface of the handle cover 32 so as to recognize touching by a user, thereby preventing misdetection and effectively recognizing an effective manipulation in the handle 40 which may be frequently touched by a user's hand.

The touch sensor 48 may be located at a position corresponding to the manipulation part 323, and accordingly, when a user presses the manipulation part 323, the touch sensor 48 may detect this pressing and may generate a signal for the operation of the electric kettle.

Meanwhile, the electric kettle of the present disclosure may include a small-capacity capacitor or a super capacitor for a keep-warm function or a keep-warm operation.

When the body 10 is seated on the base 60, the super capacitor 430 may be charged by using commercial power supplied through the lower power module 64 of the base 60 from the upper power module 55 of the body 10. For example, the super capacitor 430 may be charged by the charging circuit 420.

The small-capacity capacitor may be included in the handle 40, and may be charged by the charging circuit 420 or other means.

When the grip part 44 is coupled to the handle frame 41, space may be defined therebetween. That is, space may be defined inside the handle 40. For example, the super capacitor 430 may be provided in the inner space of the handle 40. The super capacitor 430 may be connected to the handle PCB 43.

The super capacitor 430 may be supported by a first support part 47 and a second support part 49 such that the super capacitor 430 is stably located in the inner space of the handle 40. The second support part 49 may be configured to support the lower part of the super capacitor 430 such that the super capacitor 430 is located adjacently to the handle PCB 43 in the inner space of the handle 40. For example, the second support part 49 may be configured to divide the inner space of the handle 40 in a vertical direction so as to support the super capacitor 430 from below. The first support part 47 may be configured to support the super capacitor 430 such that the super capacitor 430 does not move in the inner space of the handle 40. For example, the first support part 47, together with the super capacitor 430, may be configured to fill space in which the super capacitor 430 is located without extra space.

The handle PCB 43 may charge the super capacitor 430 or may include the charging circuit. When the body of the electric kettle is seated on the base, the charging circuit may charge the super capacitor 430. The super capacitor 430 may be rapidly charged, and may output a high output voltage.

When the body 10 is seated on the base 60, the upper power module 55 of the body 10 and the lower power module 64 of the base 60 may be in contact with each other so as to perform power supply. The lower power module 64 of the base 60 may be connected to a commercial power source. When the upper power module 55 of the body 10 and the lower power module 64 of the base 60 are in contact with each other, commercial power may be supplied through the lower power module 64 of the base 60 to the upper power module 55 of the body 10.

When commercial power is supplied to the upper power module 55 of the body 10, the super capacitor 430 connected to the upper power module 55 may be charged. The super capacitor 430 may be charged through the charging circuit. The super capacitor may be provided with a plurality of super capacitors.

Figure 8:
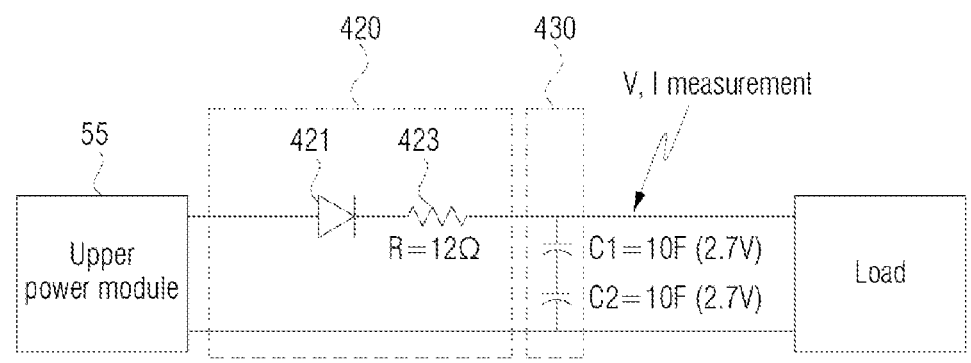
FIG. 8 is a view illustrating a charging circuit according to the embodiment of the present disclosure.

An example of the charging circuit 420 is illustrated in FIG. 8.

FIG. 8 is a view illustrating the charging circuit according to the embodiment of the present disclosure.

Referring to FIG. 8, two super capacitors 430 are provided. Each of the super capacitors 430 may have a capacity of several F (Farad), and a capacity of 10 F corresponds to 2.7V.

In the embodiment of FIG. 8, each of the super capacitors 430 has a capacity of 10 F (Farad). It takes about 3 minutes in total to fully charge the super capacitor 430. Two super capacitors 430 may be discharged for thirty to fifty minutes with a current of 3 mA.

The charging circuit 420 is a circuit for converting an AC voltage, which is commercial power supplied from the upper power module 55, to a DC voltage. The charging circuit 420 may include one diode 421 and one resistor 422. The diode 421 as a rectifier diode may convert an AC voltage to a DC voltage. In this case, since a commercial AC voltage is applied to the diode 421, a reverse voltage may be applied to the diode 421. When the reverse voltage is applied to the diode 421, a leakage current in the reverse direction may flow to the diode 421. The resistor 422 may limit the flow of the reverse current to the diode 421.

When the body 10 of the electric kettle is removed from the base 60, commercial power supplied through the base 60 may not be supplied thereto. Accordingly, the charging of the super capacitor 430 may stop.

Referring back to FIG. 7, the upper surface of the handle cover 32 may include the manipulation part 323 pressed by a user, and the display part 322 which displays the operation state of the electric kettle 1.

The manipulation part 323 may be formed on the handle cover upper surface 325 by printing or surface processing. Furthermore, under the manipulation part 323, that is, inside the handle cover 32, a switch or sensor 430a may be provided at a position corresponding to the manipulation part 323 so as to detect the manipulation of the manipulation part 323 by a user.

The manipulation part 323 may include a plurality manipulation parts. An on/off manipulation part 323 (Start/Cancel of FIG. 7) of the plurality of manipulation parts 323 may turn on and off the heating module 50. Furthermore, a temperature manipulation part 323 (Temp. of FIG. 7) may preset the temperature of water heated by the operation of the heating module 50. Additionally, a keep-warm manipulation part 323 (Keep Warm of FIG. 7) may perform the keep-warm operation such that water can be kept warm.

In addition, a time manipulation part 323 (Time/+− of FIG. 7) may allow a period of time for which water is kept warm to be preset. That is, the time manipulation part 323 may allow a user to preset a period of keep-warm maintaining time. When a user manipulates the time manipulation part 323, a certain period of time preset as default may be preset, and a user may manipulate a plus manipulation part + or a minus manipulation part − to preset the keep-warm maintaining time.

The manipulation parts 323 may be displayed on the handle cover upper surface 325. Accordingly, while holding the handle, a user may manipulate a desired manipulation part 323 of the handle cover upper surface 325 of the upper end of the handle 40 and may operate the electric kettle 1.

Furthermore, the display part 322 may display the temperature of water contained inside the electric kettle 1. The display part 322 may include multiple holes 321, and an LED disposed under each of the holes 321 may be turned on to illuminate the hole 321. Instead of the LED, various components capable of emitting light may be used, and the LED may be referred to as a light emitting member.

Additionally, the number of each temperature of water may be displayed at a position adjacent to the associated hole 321 by printing or surface processing, and a user may know a current water temperature by checking the lighting of the associated hole 321.

The manipulation part 323 and the display part 322 may be implemented by the handle PCB 43 disposed inside the handle cover 32.

Figure 9:
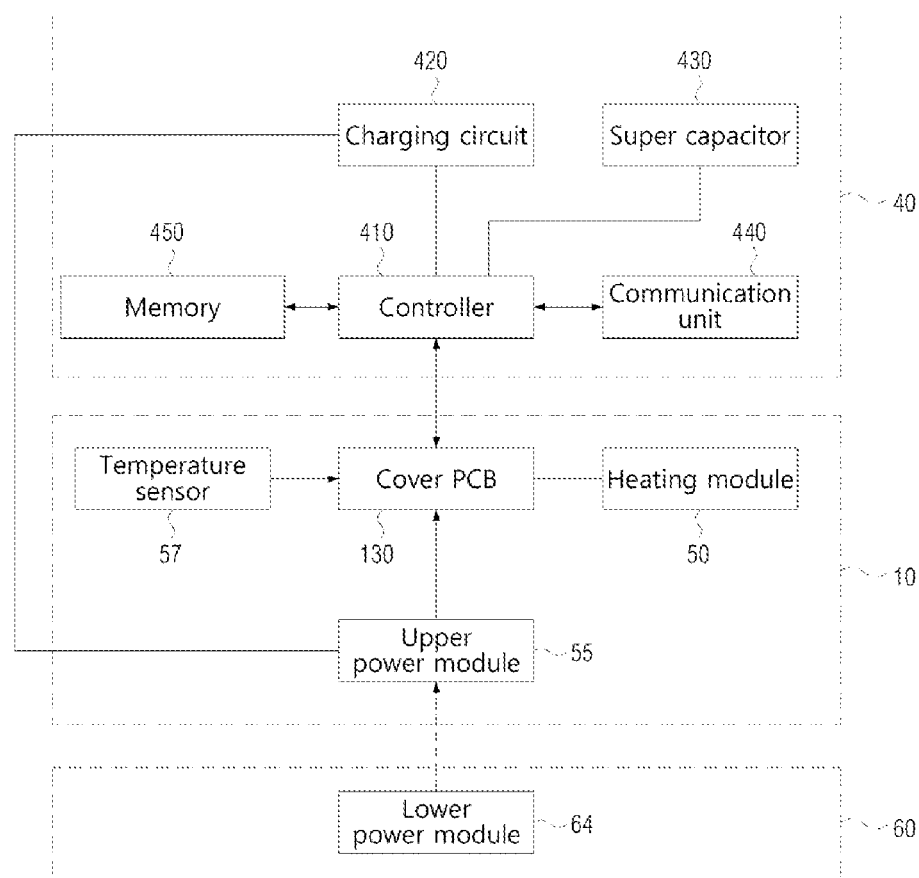
FIG. 9 is a block diagram of the electric kettle according to the embodiment of the present disclosure.

FIG. 9 is a block diagram of the electric kettle according to the embodiment of the present disclosure.

Referring to FIG. 9, in order to use the electric kettle 1, a user may plug a power line connected to the base 60 into an electrical outlet such that power is supplied to the electric kettle. In this state, water may be received the heating space 101 defined inside the body 10, and the body 10 may be placed on the base 60.

When the body 10 is seated on the base 60, the upper power module 55 and the lower power module 64 may be in contact with each other, and power may be supplied to the body 10 from the base 60.

Next, a user may manipulate the manipulation part 323 of the handle 40 to start heating the heater 54. In this case, a user may check a preset temperature through the display part 322, and may manipulate the manipulation part 323 to start heating water received in the heating space 101.

In addition, a user may preset the keep-warm operation by manipulating the manipulation part 323 of the handle 40. In this case, a user may preset a keep-warm temperature, and a period of keep-warm maintaining time, etc.

Specifically, the plurality of manipulation parts 323 may be disposed on the upper surface of the handle cover 32, and when one manipulation part 323 is pressed, the touch sensor 48 located under the manipulation part 323 may recognize the pressing such that a temperature for heating can be preset. Additionally, through the on/off of an LED preset according to the manipulation of the manipulation part 323, the display part 322 may display the preset temperature.

In addition, a user may press another manipulation part 323 of the two manipulation parts 323 after checking a preset target temperature through the display part 322. Due to the pressing of the manipulation part 323, the touch sensor 48 may recognize the pressing, and the operation of the heater 54 may be controlled through the operation PCB 43c. Of course, it is possible to command the setting and manipulation of a temperature through one manipulation part 323, and as required, at least two manipulation parts 323 may be provided.

According to the manipulation of the manipulation part 323, the heater 54 may start to operate, and water contained in the heating space 101 may be heated by heat generated by the heater 54. When a temperature sensor 57 detects that the water contained in the heating space 101 reaches a preset temperature, the heater 54 may stop operating, and the operation of the electric kettle 1 may be completed.

When the operation of the electric kettle 1 is completed, a buzzer (not shown) may output a beep sound indicating the completion of the operation of the electric kettle. A user may raise the body 10 by holding the handle 40 such that the body 10 can be removed from the base 60, and may tilt the electric kettle 1 to pour heated water through the spout 311.

The base 60 may include the lower power module 64, and the body 10 may include the upper power module 55, the temperature sensor 57, a cover PCB 130, and the heating module 50.

AC commercial power may be supplied to the lower power module 64 of the base 60. When the body 10 is seated on the base 60, the lower power module 64 of the base 60 may be in contact with the upper power module 55 of the body 10.

Accordingly, the upper power module 55 may receive AC commercial power through the lower power module 64.

The temperature sensor 57 may detect the temperature of water filled in the heating space 101. When the temperature sensor 57 detects the water temperature, the temperature sensor 57 may transmit the detection result to the cover PCB 130. The cover PCB 130 may control the supply of power to the heater of the heating module 50 on the basis of the detection result of the temperature sensor 57.

The upper power module 55 may supply power to electrical components of the body 10 and electrical components of the handle 40. Furthermore, the upper power module 55 may be connected to the charging circuit 420, which charges the super capacitor 430 disposed in the inner space of the handle 40, by an electric wire. Accordingly, commercial AC power may be supplied to the charging circuit 420 through the upper power module 55. The charging circuit 420 may charge the super capacitor 430 by converting an AC voltage to a DC voltage.

A controller 410 may be embodied as a microcontroller (MCU), a central processing unit, or a microprocessor installed on the handle PCB 43. The controller 410 may control the overall operation of the electric kettle.

A communication unit 440 is intended for wireless communication of the electric kettle 1, and may be configured as various communication modules capable of communicating in a manner such as WiFi, ZigBee, and NFC. Furthermore, the communication unit 440 may be connected to the controller 410 so as to control the overall operation of the electric kettle 1 by using wireless communication.

When the keep-warm operation is preset, the controller 410 may detect the temperature of water filled in the heating space 101, and may control the cover PCB 130 such that the heating module 50 heats until the water reaches a preset keep-warm temperature. When the temperature of the water reaches the preset keep-warm temperature, the controller 410 may store all of keep-warm setting information in an internal memory 450.

The keep-warm setting information may include a cook stage, the preset temperature, a keep-warm setting flag, a keep-warm entry flag, a keep-warm completion flag, and a period of keep-warm maintaining time. The cook stage indicates whether the heating module 50 is currently heating. The preset temperature may indicate the keep-warm temperature preset by a user or a predetermined condition. The keep-warm setting flag may indicate whether the keep-warm operation is currently preset. The keep-warm entry flag may indicate whether the electric kettle is currently in a keep-warm mode. The keep-warm completion flag may indicate whether the keep-warm operation of the electric kettle is currently completed. A period of keep-warm time may indicate a period of keep-warm maintaining time preset by a user or a predetermined condition and may decrease as time passes.

In the keep-warm setting information, the period of keep-warm maintaining time may change over time. When the electric kettle has currently completed the keep-warm operation as the period of keep-warm maintaining time has elapsed, the value of the keep-warm completion flag may change. Accordingly, the keep-warm setting information may change according to time or other conditions.

Therefore, the keep-warm setting information may be updated periodically. For example, the keep-warm setting information may be updated every five minutes. The update period of the keep-warm setting information is not limited thereto, and may be updated, for example, every one minute.

Meanwhile, for the convenience of a user, even if the body 10 is reseated on the base 60 within a predetermined period of time after the body 10 is removed from the base, the inconvenience of having to reset the keep-warm operation related to the keep-warm function is required to be eliminated.

In this case, when the body 10 is removed from the base 60, the controller 410 installed in the handle 40 may not receive power, so the controller 410 may be turned off.

Next, when the body 10 is reseated on the base 60, the controller 410 installed in the handle 40 may receive commercial power through the upper power module 55.

However, the controller 410 may not receive power while the body 10 is removed from the base 60 and thus may not know how long the body 10 is removed from the base 60.

Accordingly, even if the body 10 is reseated on the base 60 and power is supplied to the controller 410 through the lower power module 64 from the upper power module 55, the controller 410 may not know how much time has passed until the body 10 is reseated on the base 60 after removed from the body 10.

After receiving power, the controller 410 may calculate a period of time taken until the body 10 is reseated on the base 60 after the body is removed from the base through the voltage of the super capacitor or the capacitor installed to maintain the keep-warm setting.

According to the embodiment, by using the capacitor, the controller 410 may calculate a period of time for which the body 10 is removed from the base 60. The capacitor may be included in the handle 40. For example, the capacitor may be installed on the handle PCB 43. Additionally, the capacitor may have a very small capacity. For example, the capacitor may have a capacity of several tens of uF. For example, the capacitor may take only a few milliseconds to be fully charged.

Accordingly, for example, the capacitor may be fully charged when the body 10 sits on the base 60 for one second. Furthermore, the capacitor may be discharged when the body 10 is removed from the base 60. Accordingly, when the body 10 is seated on the base 60, the controller 410 may measure the voltage of the capacitor and may calculate a period of time taken until the body 10 is reseated on the base 60 after the body 10 is removed from the base 60.

Specifically, when the body 10 is seated on the base 60, the controller 410 may measure or detect the voltage of the capacitor, and may compare the detected voltage with a reference voltage. As described above, the capacitor may be charged in a very short time, and thus may be fully charged when the keep-warm function is performed after the body 10 is seated on the base 60. Accordingly, when the controller uses the capacitor and calculates a period of time taken until the body 10 is reseated on the base 60 after the body 10 is removed from the base 60, the detected voltage may be compared with the reference voltage.

The reference voltage may be a voltage of the capacitor measured or detected after the capacitor is discharged for a predetermined period of time in a state in which the capacitor is fully charged. For example, when the capacitor is fully charged, the voltage of the capacitor may be 5V. Furthermore, after the capacitor is discharged for one minute, the voltage of the capacitor may be 4V. In this case, the reference voltage may be 4V.

In this case, the controller 410 may detect the voltage of the capacitor when the body 10 is seated on the base 60 and may compare the detected voltage with the reference voltage of 4V. When the detected voltage is the voltage of 4V or more, the controller 410 may determine that the body 10 has been removed from the base 60 for one minute or less.

According to the another embodiment, the controller 410 may calculate a period of time for which the body 10 is removed from the base 60 by using the super capacitor 430 installed on the handle PCB 43. As described above, since the super capacitor 430 has several tens of F, it may take several tens of minutes to fully charge the super capacitor 430. In this case, the controller 410 may periodically detect the voltage of the super capacitor 430. For example, the controller 410 may detect a voltage according to the remaining capacity of the super capacitor 430 every ten seconds. Accordingly, the controller 410 may know the voltage of the super capacitor 430 just before the body 10 is removed from the base 60.

When the body 10 is removed from the base 60, the super capacitor 430 may not be charged but may start to be discharged. As described above, in a case in which the body 10 is seated on the base 60, the super capacitor 430 may be charged by a power voltage applied through the lower power module 64 of the base 60 from the upper power module 55 of the body 10. Accordingly, when the body 10 is removed from the base 60, the super capacitor 430 may start to be discharged. Accordingly, when a voltage of the super capacitor 430 just before the body 10 is removed from the base 60 is compared with a voltage of the super capacitor 430 at time at which the body is reseated on the base 60, a period of time taken until the body 10 is reseated on the base 60 after the body 10 is removed from the base 60 may be calculated.

The controller 410 may periodically obtain the voltage of the super capacitor 430, and thus may determine whether the voltage of the super capacitor 430 is reduced. To this end, the controller 410 may detect the charging voltage or voltage of the super capacitor 430 according to a preset period. The preset period may be preset as default in the electric kettle. Accordingly, the controller 410 may determine whether the voltage of the super capacitor 430 is reduced.

When the currently detected voltage of the super capacitor (for example, a first voltage) is less than the previously detected voltage of the super capacitor (for example, a second voltage), the controller 410 may calculate the voltage difference of the capacitor between the currently detected voltage of the super capacitor (for example, the first voltage) and the previously detected voltage of the super capacitor (for example, the second voltage).

The voltage difference may be proportional to a period of time taken until the body is reseated on the base from time at which the body is removed from the base.

Accordingly, even if the controller 410 is turned off without the supply of power, the controller 410 may detect whether the body 10 is reseated on the base 60 after the removal thereof from the base 60 when power is reapplied to the controller.

The controller 410 may determine whether the voltage difference is less than or equal to a predetermined reference value. When the voltage difference is less than or equal to the predetermined reference value, the controller 410 may determine that the body 10 is reseated on the base 60 within a predetermined period of time after the body 10 is removed from the base 60.

Since the discharge of the super capacitor 430 is made linearly with the lapse of time, the controller may calculate a period of time between the time at which the body 10 is removed from the base 60 and time at which the body 10 is reseated on the base 60 on the basis of the voltage difference of the capacitor.

For example, when the voltage of the super capacitor 430 during current detection is 3V and the voltage of the super capacitor 430 during previous detection is 3.5V, the controller 410 may determine that the body 10 is reseated on the base 60 after the body 10 is removed from the base 60. Additionally, the controller 410 may determine that a predetermined period of time, for example, one minute fifty seconds has elapsed on the basis of the fact that the voltage difference of the super capacitor 430 is 0.5V.

In this case, the controller 410 may continuously maintain the keep-warm operation since the voltage difference of 0.5V is less than or equal to the reference value, for example, 0.7V indicating the lapse of three minutes.

When the voltage difference is less than or equal to the reference value, the controller 410 may determine whether the keep-warm operation is preset. For example, the controller may determine whether the keep-warm operation or function is preset by a user.

When the voltage difference is less than or equal to the reference value, it may mean that a period of time taken until the body 10 is reseated on the base 60 from time at which the body 10 is removed from the base 60 is within a predetermined period of time.

When the keep-warm operation is preset by a user, the controller 410 may be loaded with keep-warm-related information stored in the memory 450. As described above, the keep-warm-related information may be periodically updated. The controller 410 may preset the keep-warm operation according to the keep-warm-related information read from the memory 450.

Accordingly, even if a user removes the body 10 from the base 60 several times within a predetermined period of time so as to make several cups of tea, the keep-warm operation may be maintained without being initialized, so the keep-warm function may be conveniently used.

The controller 410 may initialize the keep-warm operation when the voltage difference is greater than the reference value, for example, 0.7V indicating the lapse of 3 minutes.

Hereinbelow, the keep-warm operation method of the electric kettle will be described with reference to FIGS. 10 and 11.

Figure 10:
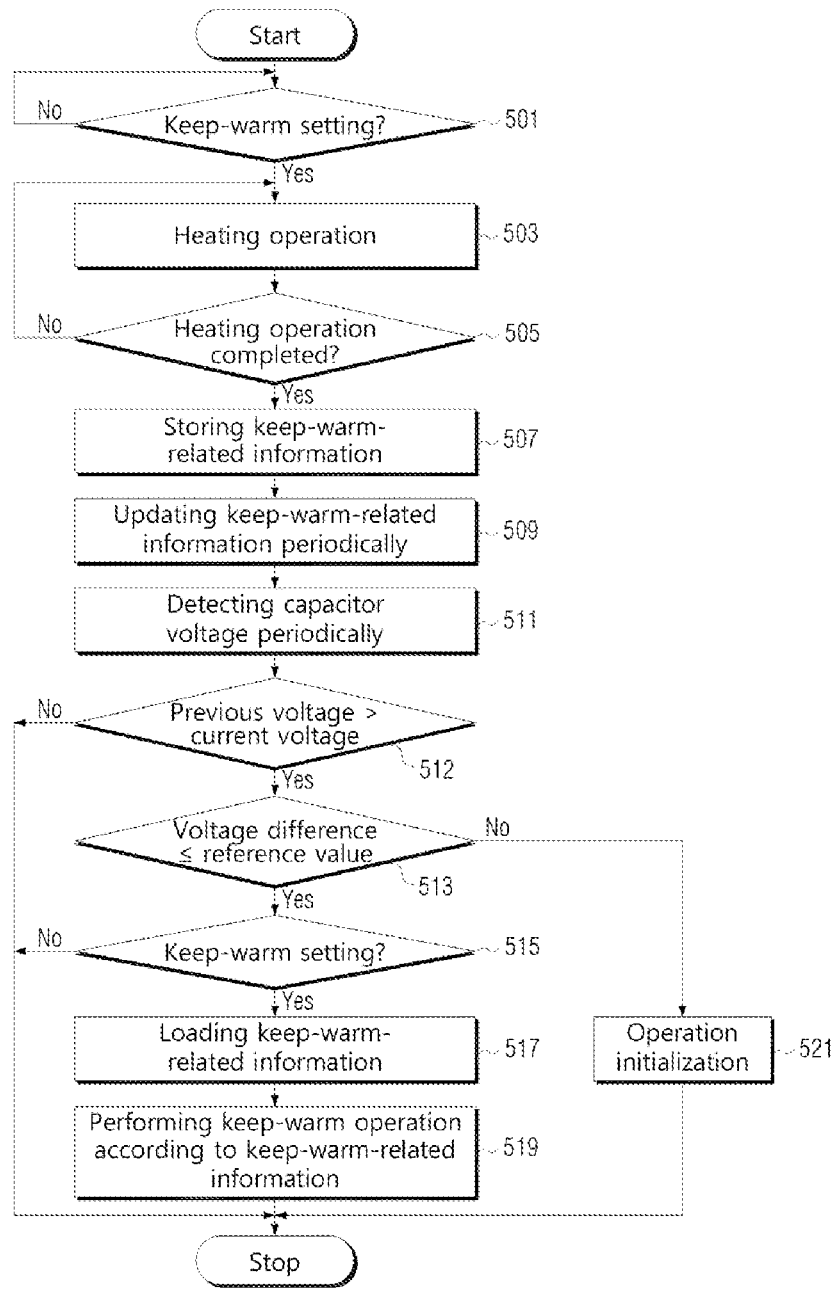
FIG. 10 illustrates a keep-warm operation method of the electric kettle according to the embodiment of the present disclosure.

FIG. 10 illustrates the keep-warm operation method of the electric kettle according to the embodiment of the present disclosure.

Referring to FIG. 10, the controller 410 of the electric kettle may determine whether the keep-warm operation is preset by a user at step 501. When the keep-warm operation is preset by a user, the controller 410 may perform a heating operation at step 503. Continuously, at step 505, the controller 410 may determine whether the heating operation is completed. For example, the controller 410 may determine whether the temperature of water received in the body 10 reaches a preset temperature.

When water received in the body 10 reaches the preset temperature, the controller 410 may store the keep-warm-related information at step 507. The keep-warm-related information may include information indicating whether the electric kettle is currently in the keep-warm mode or the keep-warm setting information. As described above, the keep-warm setting information may include the cook stage, the preset temperature, the keep-warm setting flag, the keep-warm entry flag, the keep-warm completion flag, and the period of keep-warm maintaining time.

Continuously, the controller 410 may periodically update the keep-warm-related information at step 509. The controller 410 may periodically obtain the voltage difference of the capacitor at step 511.

As described above, when the body 10 is removed from the base 60, power may not be applied to the controller 410 from the super capacitor 430, so the controller 410 may be turned off. In this case, the controller 410 may be turned off when the body 10 is reseated on the base 60.

Even if the body 10 is reseated on the base 60 and power is supplied to the controller 410 through the lower power module 64 from the upper power module 55, the controller 410 may be turned off while the body 10 is removed from the base 60, so the controller 410 may not know how much time has passed until the body 10 is reseated on the base 60 after the body 10 is removed from the base 60.

After receiving power again, the controller 410 may calculate a period of time taken until the body 10 is reseated on the base 60 after the body 10 is removed from the base 60 by using the voltage of the super capacitor 430.

Accordingly, the controller 410 may periodically detect the voltage of the super capacitor 430 at step 511, and may periodically obtain difference between the currently detected voltage of the super capacitor 430 and the previously detected voltage of the super capacitor 430. For example, the controller 410 may detect the voltage of the super capacitor 430 every 10 seconds. Accordingly, the controller 410 may know the voltage of the super capacitor 430 just before the body 10 is removed from the base 60.

Specifically, when the body 10 is removed from the base 60, the super capacitor 430 may not be charged but may start to be discharged. The discharge of the super capacitor 430 is made linearly with the lapse of time. Accordingly, when the currently detected voltage of the capacitor (for example, the first voltage) is less than the previously detected voltage of the capacitor (for example, the second voltage), the controller 410 may determine that the body 10 is removed from the base 60. Furthermore, the controller 410 may calculate a period of time between time at which the body 10 is removed from the base 60 and time at which the body 10 is reseated on the base 60 on the basis of voltage difference between the currently detected voltage and the previously detected voltage.

In other words, when a predetermined voltage of the capacitor or the super capacitor 430 (for example, the first voltage) just before the body 10 is removed from the base 60 is compared with a predetermined voltage of the capacitor or the super capacitor 430 (for example, the second voltage) at time at which the body is reseated on the base 60, the controller 410 may detect that the body 10 is removed from the base 60. Additionally, the controller 410 may calculate a period of time taken until the body 10 is reseated on the base 60 after the body 10 is removed from the base 60 by using the voltage difference.

The controller 410 may determine at step 512 whether the currently detected voltage of the capacitor (for example, a first voltage) is less than the previously detected voltage of the capacitor (for example, a second voltage). That is, the controller 410 may determine whether the body 10 is reseated on the base 60 after the body 10 is removed from the base 60. When the currently detected voltage is less than the previously detected voltage, at step 513, the controller 410 may determine whether voltage difference between the currently detected voltage of the capacitor (for example, the first voltage) and the previously detected voltage of the capacitor (for example, the second voltage) is less than or equal to a predetermined reference value. When the voltage difference is less than or equal to the predetermined reference value, the controller 410 may determine that the body 10 is reseated on the base 60 within a predetermined period of time after the body 10 is removed from the base 60. When the controller 410 determines that the body 10 is reseated on the base 60 within a predetermined period of time, for example, three minutes after the body 10 is removed from the base 60, the controller 401 may maintain a keep-warm operation preset previously.

For example, when the output voltage of the super capacitor 430 during current detection is 3V, and the output voltage of the super capacitor 430 during previous detection is 3.5V, the controller 410 may determine that the body 10 is reseated on the base 60 after the body is removed from the base. Furthermore, the controller 410 may determine that a predetermined period of time, for example, one minute fifty seconds has elapsed on the basis of the fact that the voltage difference of the super capacitor 430 is 0.5V.

In this case, the controller 410 may continuously maintain the keep-warm operation since the voltage difference of 0.5V is less than or equal to the reference value, for example, 0.7V indicating the lapse of three minutes.

Next, when the voltage difference is less than or equal to the reference value, the controller 410 may determine whether the keep-warm operation is preset at step 515. For example, the controller 410 may determine whether the keep-warm operation is preset by a user.

When the keep-warm operation is preset by a user, the controller 410 may be loaded with the keep-warm-related information stored in the memory 450 at step 517. As described above, the keep-warm-related information may be updated periodically. The controller 410 may preset the keep-warm operation according to the keep-warm-related information read from the memory 450.

At step 519, the controller 410 may perform the keep-warm operation according to the keep-warm-related information loaded from the memory 450. Accordingly, a user may conveniently use the keep-warm function since the keep-warm operation is maintained without being initialized even if the body 10 is removed from the base 60 several times within a predetermined period of time such that several cups of tea is made.

Meanwhile, when the voltage difference is greater than the reference value, for example, 0.7V indicating the lapse of three minutes, the controller 410 may initialize the keep-warm operation at step 521.

Figure 11:
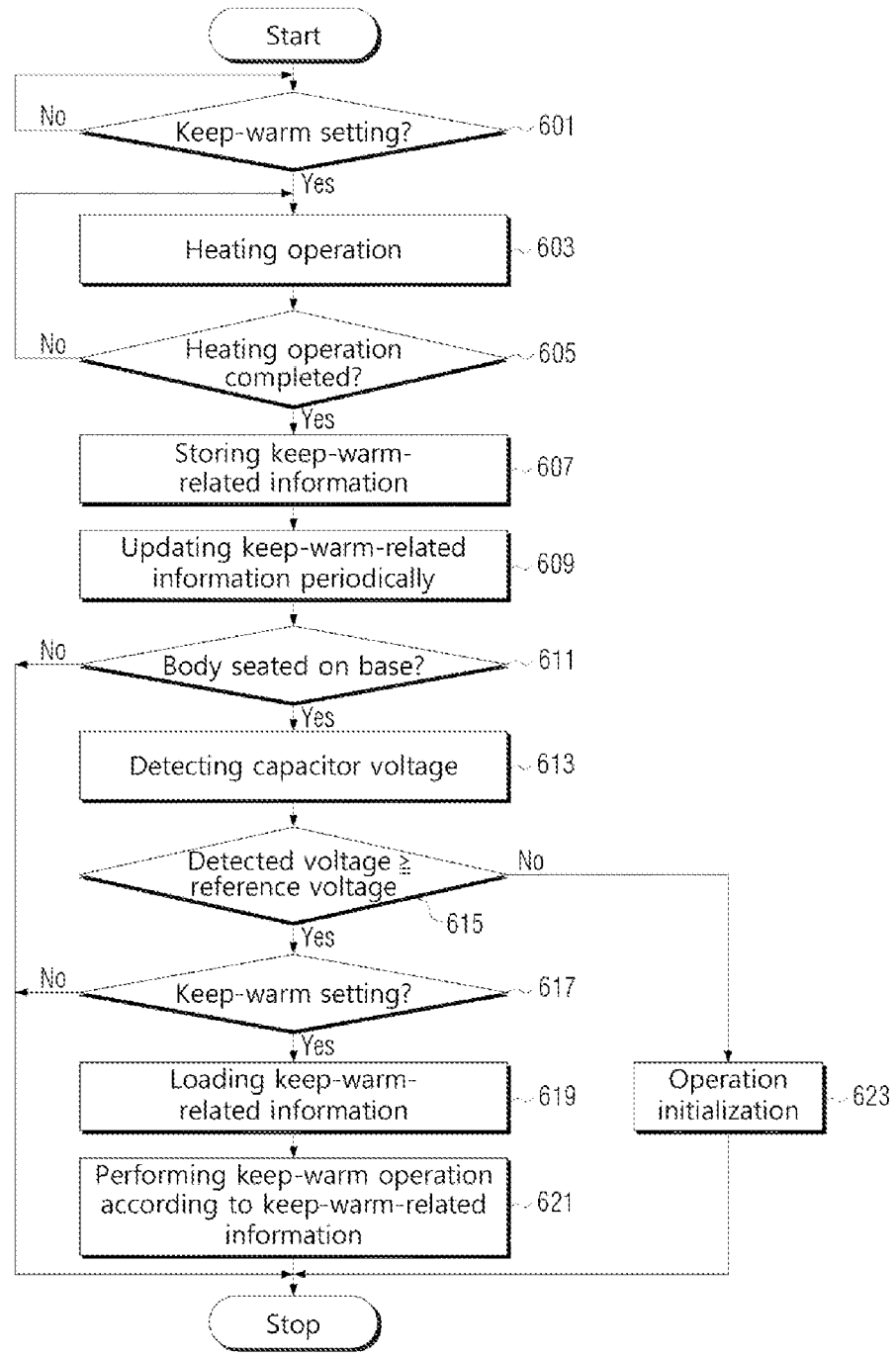
FIG. 11 illustrates a keep-warm operation method of an electric kettle according to another embodiment of the present disclosure.

FIG. 11 illustrates a keep-warm operation method of an electric kettle according to another embodiment of the present disclosure. Steps 601 to 609 of the embodiment illustrated in FIG. 11 are the same as steps 501 to 509 of the embodiment illustrated in FIG. 10, and thus detailed description thereof will be omitted.

In the embodiment, in a case in which the body 10 is reseated on the base 60 after the body is removed from the base, the controller 410 may continuously perform the keep-warm operation by using the capacitor. In the embodiment, the capacitor may have a capacity of several tens of uF and thus may be rapidly charged within a short time when the body 10 is seated on the base 60. For example, for the keep-warm operation of the electric kettle, the capacitor may be fully charged while the body 10 is seated on the base and water received in the body 10 is heated. Accordingly, when removing the body 10 from the base 60, the capacitor in the fully charged state may start to be discharged.

Referring to FIG. 11, even if the seating of the body 10 is seated on the base 60 and power is supplied to the controller 410 through the lower power module 64 from the upper power module 55, the controller 410 may be turned off during the removal of the body 10 from the base 60, so the controller 410 may not know how much time has passed until the body 10 is reseated on the base 60 after removed from the body 10.

After power is resupplied to the controller, the controller 410 may, through the voltage of the capacitor, calculate a period of time taken until the body 10 is reseated on the base 60 after the body is removed from the base.

To the end, the controller 410 may determine whether the body 10 is seated on the base 60. The controller 410 may detect the supply of power through the lower power module 64 from the upper power module 55 so as to determine that the body 10 is seated on the base 60. It may be understood by those skilled in the art that other determination conditions other than the supply of power may be used.

When the controller 410 determines that the body 10 is seated on the base 60, the controller 410 may detect or measure voltage of the capacitor at step 613, and may determine whether the detected voltage is the reference voltage or more at step 615. The reference voltage may be a voltage of the capacitor measured or detected after the capacitor is discharged for a predetermined period of time in a state in which the capacitor is fully charged.

For example, when the capacitor is fully charged, the voltage of the capacitor may be 5V. Furthermore, after the capacitor is discharged for one minute, the voltage of the capacitor may be 4V. In this case, the reference voltage may be 4V. It is apparent to those skilled in the art that such a reference voltage may change depending on the type and discharge rate of the capacitor.

In addition, it is apparent to those skilled in the art that a reference voltage may change depending on a period of time taken until the body 10 is reseated on the base 60 from time at which the body 10 is removed from the base 60. For example, when the voltage of the capacitor corresponding to the discharge period of one minute is 4V, the voltage of the capacitor corresponding to the discharge period of two minutes may be 3V.

As described above, the capacitor may have a capacity of several tens of uF and thus may be rapidly charged within a short time when the body 10 is seated on the base 60. When the body 10 is removed from the base 60, the capacitor may be discharged.

Accordingly, when the body 10 is seated on the base 60, the controller 410 may measure the voltage of the capacitor and may calculate a period of time taken until the body 10 is reseated on the base 60 from time at which the body 10 is removed from the base 60.

Since the discharge of the capacitor is made linearly with the lapse of time, the controller 410 may calculate a period of time between time at which the body 10 is removed from the base 60 and time at which the body 10 is reseated on the base 60 on the basis of the voltage of the capacitor.

To this end, when the detected voltage is greater than or equal to the reference voltage, at step 617, the controller 410 may determine whether the keep-warm operation is preset. For example, the controller 410 may determine whether the keep-warm operation is preset by a user.

When the keep-warm operation is preset by a user, the controller 410 may be loaded with the keep-warm-related information stored in the memory 450 at step 619. As described above, the keep-warm-related information may be updated periodically. The controller 410 may preset the keep-warm operation according to the keep-warm-related information read from the memory 450.

At step 621, the controller 410 may perform the keep-warm operation according to the keep-warm-related information loaded from the memory 450. Accordingly, a user may conveniently use the keep-warm function because the keep-warm operation is maintained without being initialized even if the body 10 is removed from the base 60 several times within a predetermined period of time so as to make several cups of tea.

Meanwhile, for example, when a measured or detected voltage is less than the reference voltage indicating the lapse of one minute, the controller 410 may initialize the keep-warm operation at step 623.

Meanwhile, in the present disclosure, various other embodiments may be possible in addition to the above-described embodiments. Hereinafter, the electric kettle according to the another embodiment of the present disclosure will be described in more detail with reference to the drawings.

The another embodiment of the present disclosure is different in the structure of the handle from the embodiment described before the another embodiment. Furthermore, except for the structure of the handle, other structures of the handle are the same as the structures of the handle according to the prior embodiment. For the same components, a detailed description thereof will be omitted and the same reference numerals will be used. In addition, it is notified in advance that components not shown are also the same as those of the above-described embodiment.

Although embodiments of the present disclosure have been described with reference to the accompanying drawings, the present disclosure is not limited to the above embodiments and may be manufactured in various different forms. Those skilled in the art to which the present disclosure belongs will be able to understand that the present disclosure may be embodied in other specific forms without changing the technical idea or essential characteristics of the present disclosure. Therefore, it should be understood that the embodiments described above are illustrative in all respects and not restrictive.

The invention claimed is:

1. An electric kettle comprising:
a container in which water is received, and
a base to seat the container,
wherein the container comprises:
  a handle;
  a body defining a space in which the water is received;
  a lid to open and close an open upper surface of the body;
  a heating module disposed at a lower surface of the body to heat the water contained in the body;
  a capacitor;
  a memory; and
  a controller configured to detect a voltage of the capacitor when the body is seated on the base and to perform a keep-warm operation based on a comparison result between the detected voltage and a reference voltage, and
when the body is seated on the base, the capacitor is charged using power transmitted from the base.

2. The electric kettle of claim 1, wherein the capacitor is disposed at the handle.

3. The electric kettle of claim 1, wherein when the detected voltage is greater than or equal to the reference voltage, the controller is configured to perform the keep-warm operation.

4. The electric kettle of claim 1, wherein when the detected voltage is greater than or equal to the reference voltage, the controller is configured to determine whether the keep-warm operation is preset by using keep-warm-related information stored in the memory, and perform the keep-warm operation when the keep-warm operation is preset.

5. The electric kettle of claim 1, wherein when the keep-warm operation is preset by a user, the controller is configured to store the keep-warm-related information associated with the keep-warm operation preset by the user in the memory.

6. The electric kettle of claim 4, wherein the keep-warm-related information comprises information indicating whether the electric kettle is currently in a keep-warm mode and keep-warm setting information.

7. The electric kettle of claim 6, wherein the keep-warm setting information comprises at least one of a cook stage, a preset temperature, a keep-warm setting flag, a keep-warm entry flag, a keep-warm completion flag, and a period of keep-warm maintaining time.

8. The electric kettle of claim 3, wherein the reference voltage is a voltage of the capacitor measured or detected after the capacitor is discharged for a predetermined period of time in a state in which the capacitor is fully charged.

9. The electric kettle of claim 1, further comprising:
a manipulation part disposed at the handle and capable of being manipulated by a user, the manipulation part comprising: a temperature manipulation part for presetting a heating temperature of the space of the body; a keep-warm manipulation part for entering the keep-warm operation; and a time manipulation part for presetting a period of keep-warm maintaining time.

10. The electric kettle of claim 1, wherein the capacitor has a capacity of several tens of uF.

11. An electric kettle comprising:
a container in which water is received, and
a base to seat the container,
wherein the container comprises:
  a handle;
  a body defining a space in which the water is received;
  a lid to open and close an open upper surface of the body;
  a heating module disposed at a lower surface of the body to heat the water contained in the body;
  a capacitor;
  a memory; and
  a controller configured to detect a voltage of the capacitor at a preset period and to perform a keep-warm operation based on a voltage difference between a currently detected voltage of the capacitor and a previously detected voltage of the capacitor, and
when the body is seated on the base, the capacitor is charged using power transmitted from the base.

12. A method for operating an electric kettle comprising a container in which water is received, and a base on which the container seats, the method comprising:
storing keep-warm-related information of the electric kettle in a memory;
detecting a voltage of a capacitor when the container is seated on the base after being removed from the base;
performing a keep-warm operation according to the keep-warm-related information based on a comparison result between the detected voltage of the capacitor and a reference voltage.

13. The method of claim 12, wherein the performing of the keep-warm operation comprises performing the keep-warm operation according to the keep-warm-related information stored in the memory when the detected voltage of the capacitor is greater than or equal to the reference voltage.

14. The method of claim 12, wherein the performing of the keep-warm operation comprises: determining whether the keep-warm operation is preset when the detected voltage of the capacitor is greater than or equal to the reference voltage, and performing the keep-warm operation when the keep-warm operation is preset.

15. The method of claim 13, wherein the reference voltage is a voltage of the capacitor measured or detected after the capacitor has discharged for a predetermined period of time in a state in which the capacitor is fully charged.

16. The method of claim 14, wherein the reference voltage is a voltage of the capacitor measured or detected after the capacitor has discharged for a predetermined period of the time in a state in which the capacitor is fully charged.

* * * * *